United States Patent [19]

Smith

[11] 3,747,092

[45] July 17, 1973

[54] ELECTRONIC SIREN CIRCUIT

[75] Inventor: Gerald D. Smith, Indianapolis, Ind.

[73] Assignee: Carson Manufacturing Company, Inc., Indianapolis, Ind.

[22] Filed: Dec. 7, 1971

[21] Appl. No.: 205,624

[52] U.S. Cl. .......................... 340/384 E, 340/384 R

[51] Int. Cl. .......................... H04q 3/10

[58] Field of Search .......................... 340/384 E

[56] References Cited

UNITED STATES PATENTS

| | | | |
|---|---|---|---|
| 3,284,796 | 11/1966 | Borsattino | 340/384 E |
| 3,460,136 | 8/1969 | Jambazian | 340/384 E |
| 3,493,966 | 2/1970 | Human | 340/384 E |
| 3,504,364 | 3/1970 | Abel | 340/384 E |
| 3,613,003 | 10/1971 | Kubo | 340/384 E |

*Primary Examiner*—Harold I. Pitts
*Attorney*—Harold B. Hood, George A. Gust et al.

[57] ABSTRACT

The invention is an electronic siren comprising in combination means for generating periodically occurring charging pulses at a selected one of a plurality of predetermined repetition rates, time-constant determining means coupled to the pulse generating means for generating a repeating voltage wave form in response to the charging pulses and means coupled to the time-constant determining means for generating a square wave signal having a frequency proportional to the instantaneous voltage of the voltage wave form. Coupled to the square wave generator is an output circuit which includes a first pair of transistors and first circuit means coupling the transistors to the square wave generator for driving the first pair of transistors individually and alternately into saturation in response to the aforementioned square wave signal. There are also provided a second pair of transistors and second circuit means coupling the second pair of transistors to the first pair of transistors for driving the second pair of transistors individually and alternately into saturation in synchronism with saturation of the first pair of transistors.

25 Claims, 3 Drawing Figures

INVENTOR:
GERALD D. SMITH
BY; Hood, Gust, Irish, Lundy & Coffey
ATTORNEYS

INVENTOR:
GERALD D. SMITH
BY; Hood, Gust, Irish
Lundy & Coffey
ATTORNEYS

ELECTRONIC SIREN CIRCUIT

BACKGROUND OF THE INVENTION

1. Field of the Invention

The present invention relates to electronic siren circuits and more particularly is an improved electronic siren circuit incorporating a square wave generator and an output circuit which utilizes diffused based transistors having a fast "rise" time and which are driven sharply between non-conducting and saturated states whereby heat and power losses within the circuit are minimized.

2. Description of the Prior Art

Prior art electronic siren circuits, such as that disclosed in U. S. Pat. No. 3,051,944 to the present Inventor, typically include a voltage controlled variable frequency oscillator which generates a square wave output signal, the square wave having a repetition rate or frequency in the audio frequency range. These circuits further include voltage signal generating circuits which apply a selected one of a plurality of different wave forms to the variable frequency oscillator to produce the desired siren signal. The output of the voltage controlled variable frequency oscillator is then applied to a speaker through a suitable power amplifier.

In the majority of applications, the electronic siren is installed in a motor vehicle or similar mobile unit. Consequently, the power and space available to operate and install the siren is limited. For this reason, and due to the need to produce a siren sound having a sufficient volume to be heard above normal ambient sound levels, it is important that the siren circuit produce the desired siren sounds with maximum efficiency. In this regard, prior art electronic siren circuits exhibit some loss of efficiency which results from rounding off of the square wave sound-generating signals produced therein.

SUMMARY OF THE INVENTION

The invention in its broader aspects is an electronic siren circuit which comprises means for generating a selected one of a plurality of pulse trains having different predetermined repetition rates, time constant determing means coupled to the charging pulse generating means for generating a predetermined repeating voltage signal in response to the charging pulses, and a voltage controlled variable frequency oscillator coupled to the time constant determining means for generating a variable frequency square wave signal having a frequency in the audio frequency range and adapted for producing the desired siren sound. Coupled to the square wave generator is a power output circuit which includes a first pair of diffused based transistors coupled in a push-pull configuration and first circuit means coupling the first pair of transistors to the square wave generating means for driving the first pair of transistors alternately and individually into saturation in response to the square wave signal and a second pair of diffused based transistors and second circuit means coupling the second pair of transistors to the first pair of transistors for individually and alternately driving the second pair of transistors into saturation in synchronism with saturation of the respective ones of the first pair of transistors. The output circuit further includes impedance matching means for coupling a loudspeaker or other sound reproducing devices thereto.

In a specific embodiment, there are also provided means for selectively connecting an audio signal from a radio or microphone to the first pair of transistors and biasing the first pair of transistors to their threshold of conductivity, whereby the first pair of transistors, and the second pair of transistors which operate in synchronism therewith are rendered individually and alternately proportionately conductive in response to the audio signal.

In another specific embodiment the electornic siren circuit of the present invention further includes a first isolation amplifier coupled between the time and constant determining means and the square wave generator and a second isolation amplifier coupled between the square wave generator and the power output circuit to reduce undesirable signal feedback and to facilitate use of the circuit for driving an auxiliary siren device.

In yet another specific embodiment, the square wave generating means includes a pulse-shaping network for further reducing "rounding off" of the generated square wave signal and a balance control means for rendering the square wave signal symmetrical.

It is therefore an object of the invention to provide an improved electronic siren circuit having increased power efficiency;

It is another object of the invention to provide an electronic siren circuit which exhibits less "rounding off" of the generated square wave signal;

It is still another object of the invention to provide an electronic siren circuit which utilizes diffused based transistors operated alternately between non-conductive and fully saturated states;

It is yet another object of the invention to provide such a circuit which includes means for rendering the square wave signal symmetrical;

It is still another object of the invention to provide an electronic siren circuit having an output circuit which can selectively operate both as a high efficiency square wave amplifier and as a high power low distortion audio amplifier;

It is another object of the invention to provide such a circuit which includes means for reducing signal feedback and enable the use of the circuit with auxiliary equipment.

DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
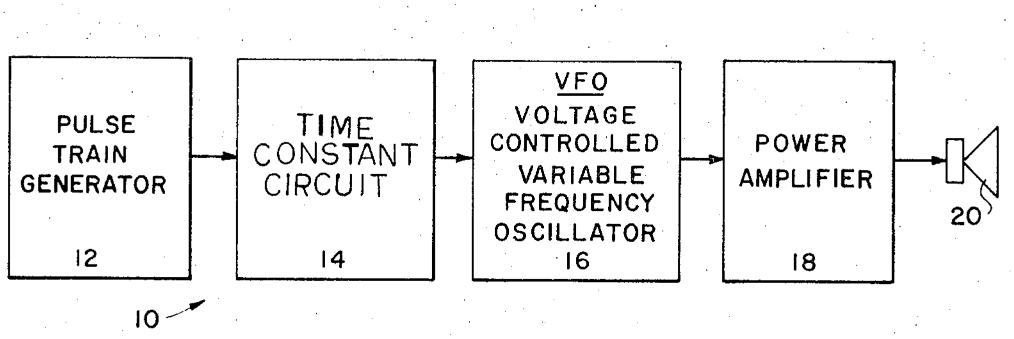
FIG. 1 is a block diagram of an electronic siren circuit in accordance with the present invention.

Referring now to the drawings, there is illustrated in FIG. 1 a block diagram of an electronic siren 10 comprising a pulse train generator 12, a time constant circuit 14 electrically coupled thereto, a voltage controlled variable frequency oscillator 16 (hereinafter referred to as VFO 16) which is coupled to the time constant circuit 14 and a power amplifier 18 which is driven by VFO 16. Connected to the power amplifier 18 is a conventional speaker 20. As will be explained in detail below, pulse train generator 12 generates a selected one of a plurality of pulse trains having different predetermined repetition rates. The pulses from pulse train generator 12 are applied to the time constant circuit 14 which generates a repeating voltage wave form. The voltage wave form is in turn applied to the VFO 16 which generates a square wave signal hvaing a frequency proportional to the voltage amplitude applied thereto. The output signal from the VFO 16 is then applied to a power amplifier 18 wherein the signal is amplified and applied to the speaker 20 to produce the desired siren tones.

Figure 2:
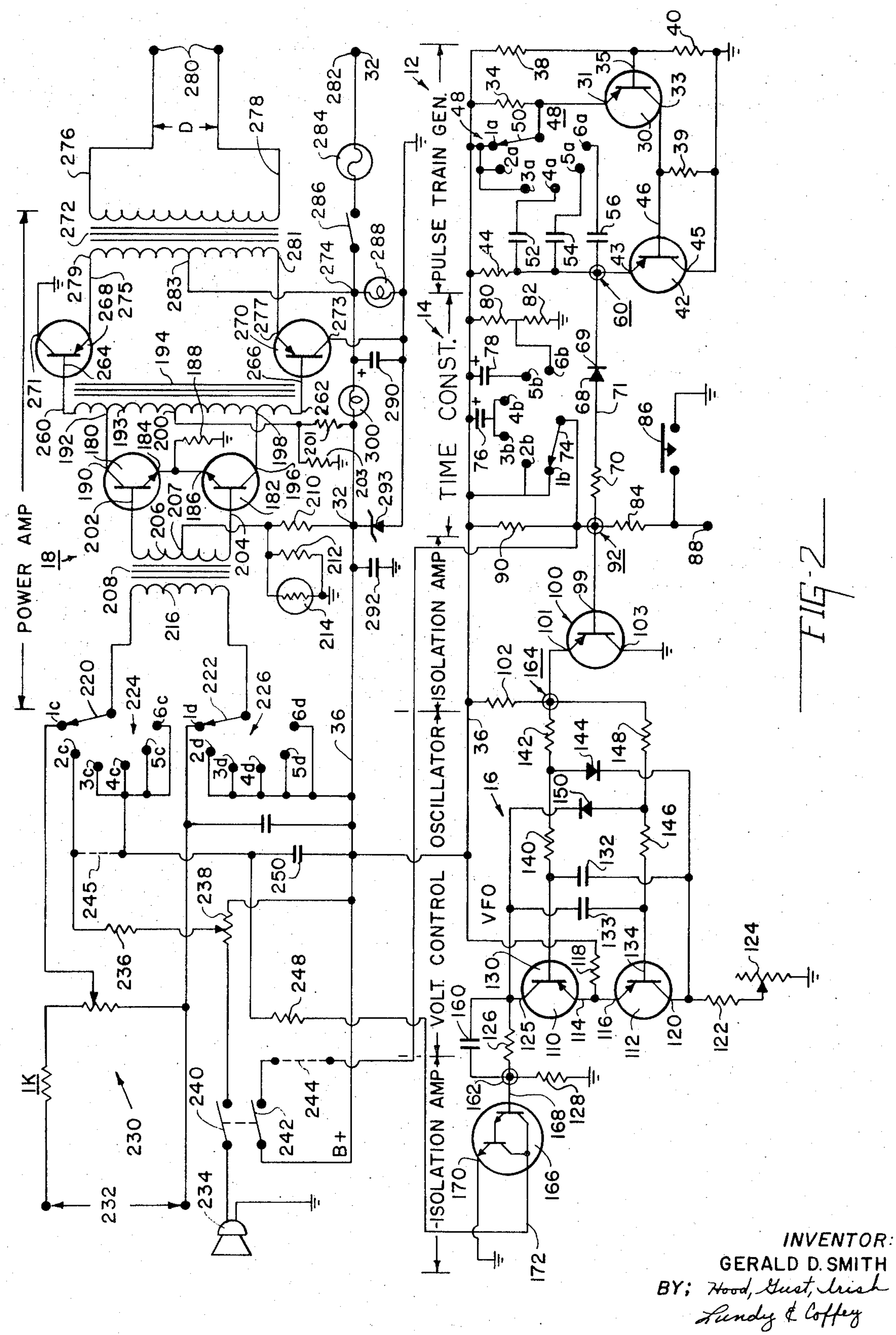
FIG. 2 is an electrical schematic diagram of the electronic siren circuit of the present invention.

Referring now to FIG. 2, pulse train generator 12 is a multivibrator oscillator circuit which includes a first oscillator transistor 30 having its emitter 31 coupled to a source of regulated direct current voltage 32 through a resistor 34 and a positive voltage supply buss 36 and its collector 33 connected to ground through resistor 39. An operating bias voltage is applied to the base 35 of oscillator transistor 30 by means of a voltage divider comprising resistors 38 and 40. A second oscillator transistor 42 has its emitter 43 connected to positive buss 36 through a resistor 44 its collector 45 connected to ground, and its base 46 coupled to ground via a biasing resistor 39, respectively.

A first six position switch 48 has its armature 50 connected directly to the emitter 31 of transistor 30. Switch 48 further includes pole terminals 1*a*, 2*a*, and 3*a* which are connected to positive buss 36, and pole terminals 4*a*, 5*a*, and 6*a* which are connected to the emitter 43 of oscillator transistor 42 through capacitors 52, 54, and 56 respectively.

The output terminal 60 of pulse train generator 12 is connected to time constant circuit 14 which comprises a diode 68 having its cathode 69 connected to output terminal 60 and a resistor 70 connected electrically in series with the anode 71 of diode 68 and output terminal 92. A second six position switch 72 is ganged with switch 48 and includes an armature 74 which is connected to output terminal 92. Switch 72 further includes pole terminals 1*b* and 2*b* which are connected to positive buss 36, terminals 3*b* and 4*b*, connected to positive buss 36 through a capacitor 76, terminal 5*b*, connected to positive buss 36 through capacitor 78, and terminal 6*b* which is connected to the center of a voltage divider network comprising resistors 80 and 82, the latter having their opposite ends connected to the positive buss 36 and ground, respectively. A charging resistor 90 is connected between output terminal 92 and positive buss 36 as shown. Also connected to terminal 92 is a resistor 84, a normally open switch 86, and an auxiliary siren terminal 88, as shown, for a purpose to be explained below.

The output signal from time constant circuit 14 appears at terminal 92 and is applied to the base 99 of an isolation amplifier transistor 100. Transistor 100 has its emitter 101 connected to positive buss 36 via load resistor 102 and its collector 103 connected to ground and functions to both amplify the signal appearing at the output terminal 92 and to provide impedance isolation between time constant circuit 14 and VFO 16.

VFO 16 is an astable multivibrator circuit which includes a pair of switching transistors 110, 112 which have their emitters 114, 116 connected in common and to supply buss 36 via resistor 118. The collector 120 of switching transistor 112 is coupled to ground via serially connected resistor 122 and variable resistor 124. The collector 125 of switching transistor 110 is coupled to ground through serially connected load resistors 126 and 128. Connected between the base 130 of switching transistor 110 and collector 120 of switching transistor 112 is a frequency determining capacitor 132 and a similar frequency determining capacitor 133 is connected between the base 134 of switching transistor 112 and the collector 125 of switching transistor 110. Resistors 140, 142 are connected electrically in series between base 130 of switching transistor 110 and the emitter 101 of isolation transistor 100 and a clamping diode 144 is connected between the common connection of resistors 140, 142 and the collector 120 of switching transistor 112 as shown. Resistors 146 and 148 and a diode 150 are similarly connected between the base 134 of switching transistor 112, the emitter 101 of isolation transistor 100, and the collector 125 of switching transistor 110.

Connected in parallel with resistor 126 is a pulse shaping capacitor 160.

The output signal from the VFO 16 appearing at output terminal 162 thereof will be a square wave signal having a frequency which is directly proportional to the voltage applied to its input terminal 164 and of essentially constant power.

Connected to output terminal 162 of VFO 16 is a second isolation amplifier 166 which includes a double transistor connected in a "Darlington" configuration. The amplifier 166 has an input terminal 168 connected to output terminal 162 of VFO 16, an output terminal 172, and a grounded terminal 170.

Power amplifier circuit 18 comprises a first pair of diffused base power transistors 180 and 182 which are connected together in a push-pull configuration wherein their emitters 184, 186 are connected in common and to ground via a resistor 188. Collector 190 of power transistor 180 is connected to one terminal 192 of the primary winding 193 of an auto transformer 194 and collector 196 of power transistor 182 is correspondingly connected to the other primary terminal 198 of auto transformer 194. The center tap 200 is connected to the center of a voltage divider circuit which includes resistors 201, 203 which are in turn connected directly to the B+ supply 32 and ground, respectively. Bases 202, 204 of power transistors 180, 182, respectively, are connected to opposite ends of the output winding 206 of a coupling transformer 208. A temperature compensated network which includes parallel connected resistor 212 and a temperature variable resistor (thermistor) 214, which has a negative temperature coefficient form a voltage divider circuit connected between B+ supply 32 and ground which applies a predetermined bias voltage to the bases of transistors 100, 182 via the center tap 207 of coupling transformer 208. The values of resistors 188, 210, 212, 201 and 203 and thermistor 214 are selected such that transistors 180, 182 are statically biased to their threshold of conductivity, that is, to a point where transistors 180, 182 are just turned "off."

The oppositely disposed terminals of the input winding 216 of transformers 208 are connected to respective ones of the armatures 220 and 222 of third and fourth six position switches 224, 226, respectively, which are also ganged with switches 48 and 72. A conventional volume control network 230 is connected across terminals 1c and 1d of switches 224, 226, respectively. Volume control network 230 includes input terminals 232 which provide a means for connecting the power amplifier 18 to radio receiver output terminals (not shown) in conventional manner.

Similarly, a microphone 234 is connected across terminals 2c and 2d, there being a conventional load resistor 236 and volume control resistor 238 connected therebetween as shown. Microphone 234 includes a momentary type "on-off" switch 240 connected in series therewith. Switch 240 is also provided with a second pair of normally open, momentary contacts 242 and a jumper 244 may be connected electrically in series therewith between the supply buss 36 and the armature 74 of switch 72 in the time constant circuit 14 and a jumper 245 connected between switch 226 terminal 2c and switch 226 terminal 2d for reasons to be explained below.

The output terminal 172 of second isolation amplifier 166 is connected to terminals 3c through 6c of switch 224 via a suitable load resistor 248, there being a capacitor 250 connected between terminals 3c through 6c and the supply buss 36 which removes or clips any spikes from the square wave signal generated in VFO 16 and prevents ringing. Terminals 2d through 6d switch 226 are connected directly to the supply buss 36.

The output terminals 260, 262 of auto transformer 194 are connected respectively to the bases 264, 266 of a second pair of diffused base power transistors 268, 270, respectively. Both power transistors 268 and 270 have their collectors 271, 273, respectively, connected to ground and their emitters 275, 277, connected to opposite ones of the input terminals 279, 281, of impedance matching transformer 272. Center tap 283 of output transformer 272 is connected to the B+ supply line 32 at 274 and the output terminals 276, 278 are connected to output terminals 280 of the siren circuit 10. It will again be observed that the interconnection of the second pair of power transistors 268, 270 enables them to operate in push-pull mode in synchronism with the operation of power transistors 180, 182.

The B+ supply 32 for the siren circuit 10 includes an input terminal 282 connected to any suitable source of positive potential such as a vehicle battery, a fuse 284 and "on-off" switch 286 connected in series therewith. An indicator light 288 is connected between "on-off" switch 286 and ground to indicate when the siren circuit has been turned "on." Also connected to "on-off" switch 286 are a pair of filter capacitors 290, 292 and a zener diode 293 having its anode connected to ground and its cathode connected to the positive buss 36. A ballast light 300 is connected electrically in series between the cathode of zener diode 293 and "on-off" switch 286 to provide better voltage regulation and overload protection of zener diode 243.

The operation of the electronic siren circuit 10 is as follows. Pulse train generator 12, as stated, is a multivibrator oscillator circuit. When armature 50 of switch 48 is in position 4a, 5a, or 6a, capacitors 52, 54, and 56, respectively, will be connected between the emitter of oscillator transistor 42 and the emitter of oscillator transistor 30. In this mode, the oscillator will generate a plurality of trains of recurring pulses appearing at output terminal 60 and shown, respectively, as wave forms A-1, A-2, and A-3 of FIG. 3. When switch 48 has its armature 50 in positions 1a, 2a, or 3a, the B+ supply voltage will be applied directly to the emitter of transistor 30 thereby biasing transistor 30 to an "on" condition. Because of the direct connection, transistor 30 will remain in this conductive state and pulse train generator 12 will produce a constant DC voltage at its output terminal 60.

When switch 72 has its armature 74 in positions 1b or 2b, DC supply 32 potential will be applied directly to the base 99 of isolation transistor 100 rendering this transistor non-conductive. When armature 74 of switch 72 is in positions 3b, or 4b, capacitor 76 will be connected to the B+ supply via resistor 90 and to the output terminal 60 of the pulse train generator 12 via resistor 70 and diode 68. Correspondingly, whenever the output from the pulse train generator 12 is at a high level, such as for example between time $t_0$ and $t_1$ in wave form A-1, or whenever oscillator transistor 42 is non-conductive as a result of transistor 30 being locked in a conducting state, a reverse bias voltage will be applied to the cathode 69 of diode 68. Reverse biasing diode 68 in turn causes a charging current to pass through resistor 90 and into capacitor 76 thereby equalizing the voltage at the opposite terminals thereof and effectively removing any charge thereon. Conversely, whenever the wave form from pulse train generator circuit 12 is at a low level, such as for example between times $t_1$ and $t_2$ of wave form A-1, the capacitor 76 will begin to devolop a charge across its terminals. This charging action will correspondingly produce a negative exponential wave form having a predetermined time constant at output terminal 92. Since, as described above, pulse train generator 12 is rendered inactive and oscillator transistor 42 statically non-conductive when switch armature 50 is in the 1a, 2a, and 3a positions, it will be seen that when switch 72 also has its armature 74 in the 1b, 2b, and 3b positions, the capacitor 76 will eventually become fully charged and the output signal appearing at output terminal 92 will be direct current voltage.

It will now be observed that when switch armature 74 is in the 3b position, manual closing of switch 86 will cause capacitor 76 to charge. Conversely, when switch 86 is opened, capacitor 76 will discharge through resistor 90. Thus, when switch armature 74 is in the 3b position, switch 86 provides a means for generating decreasing and increasing exponential voltage wave forms at terminal 92 each time it is closed and opened, respectively, with the time constant being determined by capacitor 76 and resistor 84.

When switch 72 has its armature 74 in the 4b and 5b positions and switch 48 is in the 4a and 5a positions, respectively, capacitors 76 and 78 will be connected to the output terminal 60 of the pulse train generator 12 again through resistor 70 and diode 68. Pulse train generator 12 will be oscillating thereby generating the recurring pulse train signals A-1 or A-2, respectively. In this mode, the output signal appearing at terminal 92 of the time constant circuit 14 will comprise a series of sequentially occurring increasing and decreasing exponential voltage waves having their time constant determined by capacitors 52, 54, and 76, 78, and resistors 44 and 90, respectively and of different frequency, these being shown as wave forms B-1 and B-2 in FIG. 3.

Figure 3:
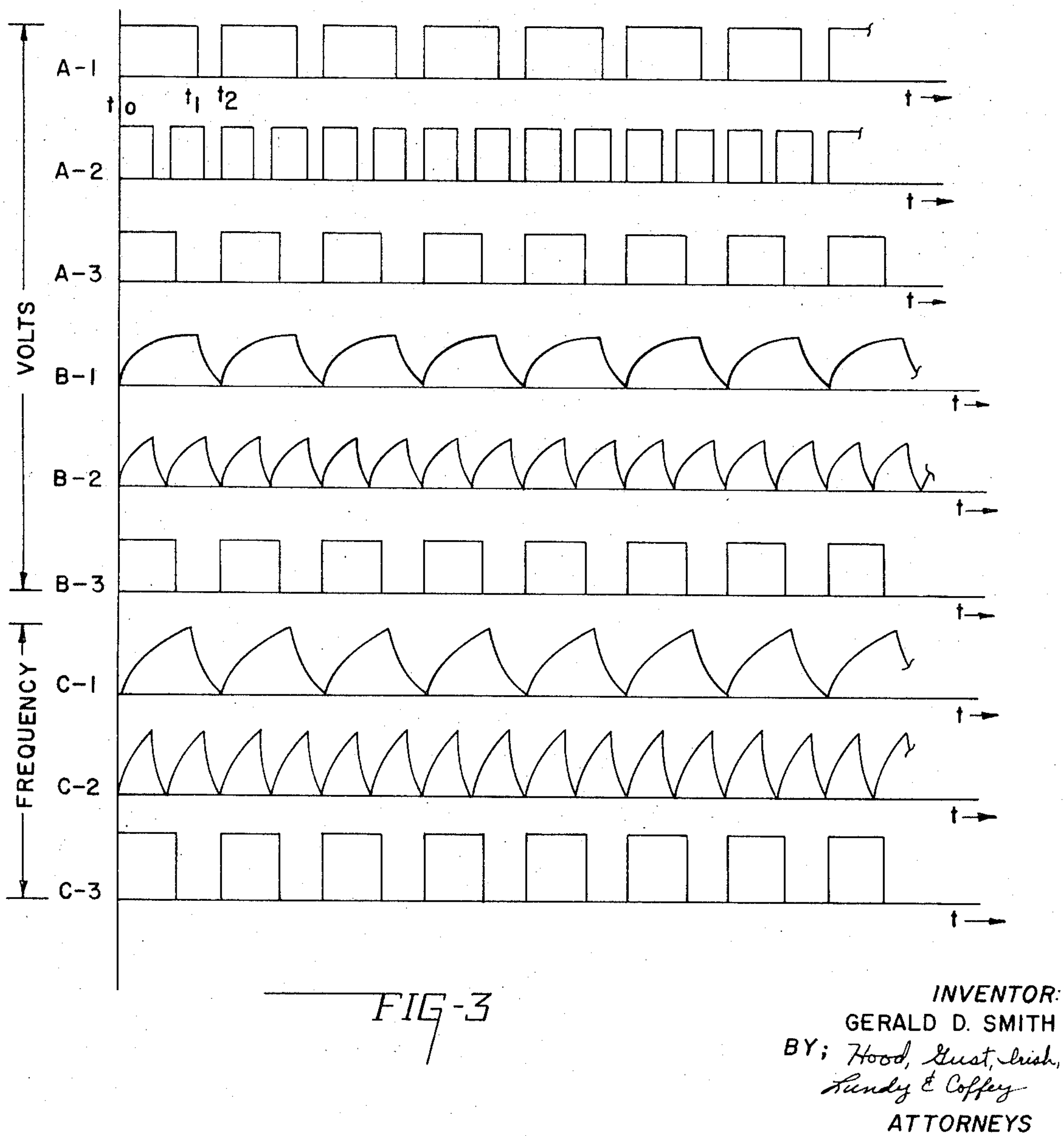
FIG. 3 is a diagram showing wave forms occurring in the electronic siren of the invention and useful in explaining the operation thereof.

When switch 72 has its armature 74 in the 6*b* position and switch 48 has its armature 50 in the 6*a* position, pulse train generator 12 will again generate a series of recurring pulse signals these being shown as wave form A-3 in FIG. 3. However, these signals are now applied through terminal 6*b* of switch 72 to the voltage divider resistors 80, 82. Correspondingly, there will be produced a voltage wave form B-3 which is itself a square wave.

The respective ones of the wave forms being generated at output terminal 92 will be passed through and amplified by isolation transistor 100 and applied to the input terminal 164 of the VFO 16.

As stated above, the VFO 16 is a variable frequency, astable multivibrator circuit. The operation of this type of circuit is well known to those skilled in the art and it is sufficient to state that it will generate a square wave signal having a frequency which is directly proportional to the voltage applied to its input terminal 164. The value of the components of the VFO 16 are selected such that its signal frequency will be within the audio range for all values of voltage applied to its input terminal 164 by the time constant circuit 14.

VFO 16 also includes a balance control 124. This balance control 124 enables adjusting the symmetry of the square wave signal generated by the VFO circuit 16 whereby the square wave signal will be rendered perfectly symmetrical. Since the power efficiency of the power amplifier 18 will be diminished if the square wave signal generated thereby is not symmetrical, it will now be apparent that the balance control 124 provides a simple yet effective means for optimizing the power efficiency of the power amplifier 18.

Similarly, the addition of the capacitor 160 connected across load resistor 126 will reduce the switching time of the transistors 130, 134. This in turn reduces the amount of "rounding off" of the square wave produced by the VFO 16 and again contributes to the efficiency thereof. The output signal from the VFO circuit 16 will therefore be a variable frequency, constant power square wave signal having a frequency directly proportional to the voltage applied to the input terminal 164 thereof. This output signal will be either a constant frequency signal whenever switches 48 and 72 have their armatures in the 1*a*, 2*a*, and 1*b*, 2*b* positions, respectively. This signal will be a manually controlled variable frequency signal when switches 48 and 72 have their armatures 50 and 74 in the 3*a*, 3*b* positions or switch 86 is manually operated. When switches 48 and 72 have their armatures 50 and 74 in the 4*a*, 5*a*, and 6*a*, and 4*b*, 5*b*, and 6*b* positions, respectively, the wave form appearing in the output terminal 92 will be the wave form B-1, B-2, or B-3 thereby causing the VFO circuit 16 to produce a variable frequency signal having frequency envelopes C-1, C-2, or C-3, (FIG. 3) respectively.

The amplifier 166 will amplify the output signal from the VFO 16 and apply this signal to the input winding 216 of coupling transformer 208 whenever switches 220 and 222 have their armatures 224, 226 in the 3*c*, 4*c*, 5*c* and 6*c*, and 3*d*, 4*d*, 5*d*, and 6*d* positions, respectively. The voltage of the signal generated by the VFO circuit 16 will again be of constant power, and only the frequency thereof varies.

The magnitude of the signal from the VFO circuit 16 and isolation amplifier 166 is sufficient magnitude to drive or bias power amplifier transistors 180 and 182 individually and alternately between fully saturated and fully "off" states. Power transistors 180, 182, because they are diffused based transistors, will switch between their saturated and fully "off" condition with a minimum of "rounding off" of the wave fronts and thereby again adding to the efficiency of the circuit.

It will be observed that the biasing of transistors 268, 270 is effected by transistors 180, 182 by reason of their having their bases coupled directly to the output circuit of a respective one of transistors 180, 182. Consequently, transistors 268, 270 are biased to either a conductive or a non-conductive state directly by the respective one of transistors 180, 182. That is, transistors 268, 270 will be either conductive, when transistors 180, 182 are conductive, respectively, or will be non-conductive when transistors 180, 182 are non-conductive, respectively. Thus transistors 268, 270 are seen to be automatically biased or controlled by the transistors 180, 182.

When the siren 10 is operating in a siren mode, the signals applied to the bases 202, 204 of power transistors 180, 182 are of sufficient magnitude to drive the transistors 180, 182 between fully "off" and a satureted, fully "on" condition. Transistors 180, 182 will, when saturated, drive transistors 268, 270 into saturation. When transistors 268, 270 are in a saturated, "on" condition they will experience a minimum of heat build up thereby enabling transistors 268 and 270 to be operated at substantially higher power levels than would be possible if they were operated in less than a saturated condition when conductive. Further, when transistors 180, 182, 268, and 270 are being operated in a saturated state, it has been found that transistors 268, 270 will produce a significant amount of power gain despite the fact that they are connected in an emitter follower configuration.

When the power amplifier circuit 18 is being used to amplify a signal from a radio receiver means (not shown), or from microphone 234, it will be apparent that transistors 180, 182 and transistors 268, 270 must operate as relatively low distortion amplifier devices. Accordingly, when it is desired to use a power amplifier 18 as an audio amplifier for the radio or microphone signal, it is not possible to drive the transistors 180, 182, 268 and 270 between fully "off" and fully "on," saturated states. Rather, transistors 180, 182 still operate to automatically bias the second pair of transistors 270, 272, but to a degree of conductivity less than or below their saturation levels. Specifically, an audio signal applied to the transistors 180, 182 from either the radio input terminals 232 or from the microphone 234 is maintained at a level substantially below that required to drive the first pair of transistors 180, 182 into saturation. Because transistors 180, 182 are biased to their threshold of conductivity as described above, and by reason of their connection in a push-pull configuration, they will be alternately and individually rendered conductive by alternately phased portions of the input signals from the radio input terminals 232 or microphone 234. Transistors 180, 182 will in turn render transistors 268, 270 alternately and individually conductive, respectively, but not saturated. Operating in this manner, it will be observed that each of the transistors 268, 270 will be operated for a 50 percent or less duty cycle and, simultaneously, will operate with relatively low distortion. Correspondingly, these latter two transistors can be operated as audio amplifier components and at substantially higher power levels than would be possible were transistors 268, 270 statically biased in a conventional manner.

It should further be noted that diffused based transistors are primarily adapted for use as high power switching transistors which, as stated, are capable of switching between their fully saturated and fully "off" conditions with great speed and exhibit low heat build up when conducting in a saturated state. It is this characteristic of the diffused base transistor which renders it desirable for use in a high power, square wave amplifier. However, these same characteristics normally render a diffused based transistor unsuitable for use as an audio amplifier component since the load impedances used therewith to enable the highest power output from the transistor would cause the transistors to overheat and burn out in a very short period of time should the transistors be statically biased for operation in a linear region as is normally done when the device is used in an audio amplifier. However, in the present circuit, the interconnection of the two pairs of power transistors 180, 182 and 268, 270, whereby the second pair of transistors 268, 270 are automatically biased by the first pair of transistors and whereby the second pair of transistors 268, 270 are rendered non-conductive for at least half of the time, enables the use of these transistors as audio amplifier components at high power levels and without the danger of transistors 268, 270 being over driven and burned out.

It should be noted that when jumpers 244 and 245 are installed in the circuit, the VFO circuit 16 will continue to operate and thereby produce a siren signal at the output terminal 280 of the power amplifier 18 even when switches 220, 222 have their armatures in the 2*c* and 2*d* positions, respectively. However, when the microphone switch 240 is closed, and correspondingly microphone terminals 242 are closed, the B+ potential will be applied directly to the base of isolation transistor 100 rendering it non-conductive. This in turn will cause full B+ potential to be applied to the bases 130, 134 of the VFO circuit 16 rendering it inactive. It can thus be seen that utilization of the jumpers 244, 245 will cause automatic turning "off" of the siren whenever the microphone switch 240 is depressed thereby permitting simultaneous use of both devices.

When an auxiliary siren circuit (not shown) is connected to auxiliary siren terminal 88, the interconnecting wires will generally possess a significant amount of reactance. This reactance would, in turn, normally result in degradation of the operation of VFO circuit 16 and possibly cause it to "run away." However, isolation amplifier 100 prevents this reactance from affecting the VFO circuit parameter.

It can thus be seen that the electronic siren circuit of the present invention, by providing means for rendering the square wave signal generated within the VFO circuit 16 perfectly symmetrical, by reason of the minimization of the "rounding off" of the square wave generated thereby, and the utilization of diffused base transistors in the power amplifier circuit produces an electronic siren circuit having a maximum power efficiency.

In a working model of an electronic siren circuit in accordance with the present invention, the following component values were used with resistors followed by an (*) having a 5 percent tolerance.

RESISTORS

| | | | |
|---|---|---|---|
| **34** | 10 K * | **126** | 1.8 K * |
| **38** | 8.2 K | **128** | 560 |
| **39** | 22 K * | **122** | 1.8 K |
| **40** | 32 K | **124** Pot.3 | |
| **44** | 7.5 K * | **140** | 22 K * |
| **70** | 3.3 K | **142** | 22 K * |
| **80** | 18 K * | **146** | 22 K * |
| **82** | 10 K * | **148** | 22 K * |
| **84** | 2.2 K | **188** | 1 |
| **90** | 47 K | **212** | 47 |
| **102** | 4.7 K | **230** | 1 K |
| **118** | 390 * | **236** | 560 |
| | | **248** | 1.8 K |

POTENTIOMETERS

| | |
|---|---|
| **124** | 500 ohms. |
| **230** | 100 |
| **238** | 350 (linear) |

CAPACITORS

| | | | |
|---|---|---|---|
| **52** | 200 mfd, 10 volt | **133** | 0.022 mfd |
| **54** | 100 mfd, 10 volt | **160** | 0.047 mfd |
| **56** | 39 mfd, 10 volt | **250** | 0.1 mfd |
| **76** | 150 mfd, 10 volt | **290** | 200 mfd, 15 volt |
| **78** | 4.7 mfd, 10 volt | 292 | 200 mfd, 15 volt |
| **132** | 0.022 mfd | | |

TRANSISTORS

| | |
|---|---|
| **30, 42, 100, 112** | 2N4402 |
| **180, 182** | TIP41 |
| **268, 270** | CP 2357 |
| Amplifier **166** | 2N5307 |

DIODES

| | |
|---|---|
| **69, 144, 150** | IN 457 |
| **293** | IN 2030B (Zener) |

While there have been described above the principles of this invention in connection with specific apparatus, it is to be clearly understood that this description is made only by way of example and not as a limitation to the scope of the invention.

What is claimed is:

1. In an electronic siren the combination comprising:

a. means for selectively generating periodically occurring charging pulses at one of a plurality of predetermined repetition rates, b. time constant determining means coupled to said pulse generating means for generating a corresponding plurality of repeating voltage wave forms in response to said charging pulses, c. means coupled to said wave form generating means for generating a square wave signal having a frequency proportional to the instantaneous voltage of said voltage wave form, d. a power output amplifier circuit including 1. a first pair of diffused base transistors connected in a push-pull circuit configuration,
2. first circuit means selectively coupling said first pair of transistors to said square wave generator for driving said first transistors individually and alternately into saturation in response to said square wave signal,
3. a second pair of diffused base transistors connected in a push-pull emitter follower configuration,
4. second circuit means coupling said second pair of transistors to said first pair of transistors for driving said second pair of transistors individually and alternately into saturation in synchronism with saturation of respective ones of said first pair of transistors, and e. impedance matching means for coupling said second pair of transistors to a sound reproducing device.

2. The combination of claim 2 wherein said first circuit means includes means for applying said square wave signal to the bases of said first pair of transistors, said second circuit means is coupled to the bases of said second pair of transistors, said second circuit means includes an auto transformer having a pair of input terminals and a pair of output terminals, said first pair of transistors each having a similar one of their collector and emitter connected in common, and the other of their collector and emitter connected to said input terminals, respectively, said second pair of transistors having their bases connected individually to different ones of said output terminals.

3. The combination of claim 1 further comprising means for generating a first audio signal, said first circuit means further including first switch means for selectively connecting said power output circuit to one of said square wave generators and said audio signal means, means for electrically biasing the transistors of said first pair of transistors to their threshold of conductivity whereby said first circuit means renders said first pair of transistors individually and alternately conductive in proportion to said first audio signal.

4. The combination of claim 3 further comprising means for electrically biasing the transistors of said first pair of transistors to their threshold of conductivity, said first circuit means rendering said first pair of transistors individually and alternately conductive in proportion to said first and said second audio signals in response thereto.

5. The combination of claim 3 wherein said second circuit means includes means for rendering said transistors of said second pair of transistors individually and alternately conductive in proportion to the degree of conductivity of said first pair of transistors when said output circuit is selectively connected to said audio signal means.

6. The combination of claim 1 wherein said square wave generating means comprises an astable multivibrator circuit which includes a pair of switching transistors, said switching transistors each having a similar one of their collector and emitter connected in common, their bases coupled to said time constant determining means, and a pair of capacitors connecting the other of said collector and emitter of each said switching transistor to the base of the mutually opposite one of said switching transistors, the switching frequency of said multivibrator being proportional to the voltage applied to said bases.

7. The combination of claim 6 wherein said multivibrator circuit includes an output circuit having a pulse-shaping means for increasing the switching speed of said switching transistors.

8. The combination of claim 7 wherein said multivibrator further includes balancing means for rendering said square wave symmetrical.

9. The combination of claim 8 wherein said balancing means includes a resistor and a potentiometer connected electrically in series with the collector-emitter circuit of one of said switching transistors.

10. The combination of claim 9 wherein said pulse-shaping means is a capacitor connected electrically in series with the collector-emitter circuit of the other of said switching transistors.

11. The combination of claim 1 wherein said first circuit means includes means for electrically isolating said power output circuit and said multivibrator circuit.

12. The combination of claim 11 wherein said isolating means comprises a Darlington amplifier circuit which includes an input terminal coupled to said output circuit.

13. The combination of claim 18 further comprising second isolating means for electrically isolating said square wave generating means from said time contant determining means.

14. The combination of claim 13 wherein said second isolating means includes an isolation transistor having a base, and a collector-emitter circuit, said base being connected to said wave form generating means, said collector-emitter circuit being coupled to said square wave generating means.

15. The combination of claim 1 wherein said pulse generating means is a second multivibrator oscillator.

16. The combination of claim 15 wherein said second multivibrator oscillator includes a plurality of frequency determining elements and second switch means for selectively connecting a predetermined one of said frequency determining elements into said oscillator circuit thereby determining the switching frequency of said multivibrator.

17. The combination of claim 16 wherein said selecting means includes a multiple pole switch.

18. The combination of claim 16 wherein said frequency determining elements are capacitors.

19. The combination of claim 1 further comprising means for selectively disabling said pulse generating means and means coupled to said time constant determing means for manually generating a plurality of charging pulses, said time constant determing means being responsive to said manually generated pulses to generate one of said wave forms.

20. The combination of claim 14 further comprising means for coupling an auxiliary siren circuit to said time constant determining means.

21. The combination of claim 20 wherein said auxiliary siren connecting means is connected to said time constant determining means, said second isolating means being connected between said auxiliary siren connecting means and said square wave generator.

22. For use in an electronic siren capable of producing selectively, audio and siren signals, a power output amplifier circuit including a. a first pair of diffused base transistors connected in a push-pull amplifier circuit configuration having input and output circuits, means for selectively biasing said transistors to the threshold of conductivity whereby audio signals coupled to said input circuit renders said transistors alternately conductive in proportion to the amplitude thereof, b. a second pair of diffused base transistors connected in a push-pull emitter-follower amplifier configuration having input and output circuits, means coupling the first-mentioned output circuit to the second-mentioned input circuit for driving said second pair of transistors alternately into saturation in synchronism with saturation of respective ones of said first pair of transistors, c. impedance-matching means for coupling said second pair of transistors to a sound producing device, said impedance matching means having input and output circuits the input circuit of which being connected across the emitters of said second transistors, the last-mentioned input circuit having an impedance appearing across said emitters.

23. The circuitry of claim 22 wherein said coupling means includes an auto transformer having a pair of input terminals and a pair of output terminals, said first pair of transistors each having a similar one of the collectors and emitters connected in common and the other connected to said input terminals, respectively, said second pair of transistors having the bases thereof connected respectively individually to different ones of said output terminals.

24. The circuitry of claim 23 in which the emitters of said first transistors are connected in common and the collectors thereof are connected, respectively, to said input terminals, said impedance-matching means including a transformer having primary and secondary windings, the primary winding being connected between the emitters of the second transistors, a source of voltage connected between the center of said primary winding and the collectors of said second transistors.

25. The circuitry of claim 24 including a square-wave generator and a source of audio signals selectively coupled to said input circuit of the first-mentioned amplifier and switch means for selecting which of said generator or source is applied to said first mentioned input circuit.

* * * * *

UNITED STATES PATENT OFFICE
CERTIFICATE OF CORRECTION

Patent No. 3,747,092 Dated July 17, 1973

Inventor(s) Gerald D. Smith

It is certified that error appears in the above-identified patent and that said Letters Patent are hereby corrected as shown below:

Column 3, Line 11, change "hvaing" to ---having---;
Column 7, LIne 67, delete the word "magnitude";
Column 8, lines 24 and 25, change "satureted" to
-- saturated --.

Claim 2, Column 11, Line 4, change "2" to ---1---;
Cancel Claim 4;
Claim 13, Column 12, Line 1, change "18" to ---8---.

Signed and sealed this 26th day of February 1974.

(SEAL)
Attest:

EDWARD M.FLETCHER,JR.
Attesting Officer

C. MARSHALL DANN
Commissioner of Patents